United States Patent
Maag et al.

[11] Patent Number: 6,137,820
[45] Date of Patent: Oct. 24, 2000

[54] OPTICALLY PUMPED LASER

[75] Inventors: Robert Maag, Aalen; Heinz Abramowsky, Heidenheim; Martin Wiechmann, Jena, all of Germany

[73] Assignee: Carl-Zeiss-Stiftung, Heidenheim, Germany

[21] Appl. No.: 08/602,090

[22] Filed: Feb. 15, 1996

[30] Foreign Application Priority Data

Feb. 15, 1995 [DE] Germany .................... 195 04 963

[51] Int. Cl.[7] .................................................. H01S 3/08
[52] U.S. Cl. ........................ 372/108; 372/98; 372/99; 372/106; 372/21; 372/22
[58] Field of Search ................... 372/21, 22, 39, 372/69, 70, 71, 72, 92, 93, 98, 99, 101, 106, 108

[56] References Cited

U.S. PATENT DOCUMENTS

| | | | |
|---|---|---|---|
| Re. 34,729 | 9/1994 | Sipes, Jr. .................... | 372/75 |
| 4,570,081 | 2/1986 | Baldwin .................... | 307/426 |
| 4,858,239 | 8/1989 | Shoshan .................... | 372/9 |
| 5,031,182 | 7/1991 | Anthon et al. .................... | 372/31 |
| 5,050,175 | 9/1991 | Ayral et al. .................... | 372/21 |
| 5,121,402 | 6/1992 | Scheps .................... | 372/70 |
| 5,170,406 | 12/1992 | Tidwell .................... | 372/71 |
| 5,394,412 | 2/1995 | Huignard et al. .................... | 372/9 |
| 5,418,805 | 5/1995 | Zhiglinsky et al. .................... | 372/69 |
| 5,566,197 | 10/1996 | Nillsson .................... | 372/20 |

OTHER PUBLICATIONS

"Pure single–mode $LiNdP_4O_{12}$ solid–state laser transmitter for 1.3–$\mu$m fiber–optic communications" by K. Kubodera et al, Applied Optics, vol. 21, No. 19, Oct. 1, 1982.

"Efficiency of Nd Laser Materials with Laser Diode Pumping" by N. Barnes et al IEEE Journal of Quantum Electronics, vol. 26, No. 3, (1989), pp. 558 to 569.

*Primary Examiner*—Brian Healy
*Attorney, Agent, or Firm*—Walter Ottesen

[57] ABSTRACT

Optically pumped laser wherein the light beam P, which comes, for example, via light conductors 4 from the pump light source 200, is split into two component beams (T1, T2), for example, by a beam splitter 2. The two component beams (T1, T2) are directed to the laser medium 1 separately, for example, from both ends, or at an angle onto one end. Laser crystals such as $Nd:YVO_4$, Nd:YLF, Nd:LSB or Nd:YAP having polarization-dependent absorption are especially suitable for pumping.

17 Claims, 3 Drawing Sheets

OPTICALLY PUMPED LASER

FIELD OF THE INVENTION

The invention relates to an optically pumped laser including a laser medium, a laser resonator and a pump light source.

BACKGROUND OF THE INVENTION

Such lasers exist in many variations. Often, measures are provided with which light of several pump light sources is coupled into the laser medium so that the power is thereby increased.

U.S. Pat. No. Re. 34,729 discloses a solid-state laser including, inter alia, a Nd:YLF-crystal. The solid-state laser is axially pumped at both ends by laser diode arrays. Two pump light sources can be superposed by a polarizing beam splitter. A dichroic deflection mirror is provided for separating the beam paths of the laser light and of the pump light outside of the laser resonator. Light conductors are not provided.

U.S. Pat. No. 5,170,406 discloses a solid-state laser which is pumped at an angle and off-axis at both ends by laser diode arrays. A separate beam path without a light conductor corresponds to each pump light source. The laser beam path is unaffected by optical elements for pumping.

K. Kubodera, J. Noda, Applied Optics, volume 21 (1982), pages 3466 to 3469, provides an example for a laser diode end-pumped solid-state laser having fiber coupling. A light-conducting fiber and a focussing lens are assigned to each light source. One fiber/lens unit is axially mounted relative to the laser rod and the remaining fiber/lens units are mounted on a cone so as to lie at an angle to the laser rod.

It is known that various laser crystals have an absorption dependent on polarization and this has an influence on the efficiency of the generation of laser light. In this connection, reference can be made, for example, to N. P. Barnes et al, IEEE Journal of Quantum Electronics, volume 26, (1989), pages 558 to 569, Table I. Examples are Nd:$YVO_4$, Nd:YLF, Nd:LSB, or Nd:YAP.

Light conductors and especially light conducting fibers and bundles thereof are advantageous for coupling from pump light source and laser medium. This is especially the case because of their flexibility and the possibilities for geometric configurations. However, as a rule, the light conductors depolarize the transmitted light.

SUMMARY OF THE INVENTION

It is an object of the invention to provide a new arrangement for transmitting the pump light from a pump light source to the laser medium. The pump light source is assembled from any desired number of elements. The arrangement makes possible an increased efficiency in combination with the use of light conductors especially for polarization-sensitive laser media. The arrangement overall opens expanded possibilities for the pump configuration.

The optically pumped laser of the invention includes: a laser resonator having a laser medium defining an optical axis; a pump light source for supplying a pump light beam; a device for splitting the pump light beam into a first component beam and a second component beam; a first set of optics for conducting the first component beam to the laser medium; and, a second set of optics for conducting the second component beam to the laser medium.

According to another feature of the invention, the light beam is split by physical beam splitting especially by a polarization beam splitter. The two component beams having the same polarization direction are adapted to the polarization-dependent absorption characteristics of the laser medium and are supplied to the laser medium. This results in optimum efficiency.

Because of the known advantages for efficiency et cetera, end pumping is preferred and end pumping can be at both ends and is preferably axially symmetrical but also at an angle. The end pumping can be at one end with both component beams and pumping can be at such an angle that the pump optics does not disturb the laser light, that is, no corresponding dichroic elements, beam splitters, et cetera are needed.

Because of the flexibility in construction and manipulation, pump light sources having light conductors, especially individual light-conducting fibers or light-conducting fiber bundles are used. Precisely here, where the light conductors function to depolarize, a clear improvement results with the embodiment of the invention because, without the invention and with laser media, which are polarization sensitive, half of the depolarized light, which exits from the light conductor, would have had a significantly lower pump action.

Laser diodes, and for higher powers, laser diode arrays are preferred as actual light generators in the pump light source.

A solid body is preferable as a laser medium, especially a crystal of Nd:$YVO_4$, Nd:YLF, ND:LSB or ND:YAP. These crystals exhibit double refraction and have a polarization-dependent absorption for the optical pumping. The embodiment of the invention of a laser having one of these crystals as a laser medium therefore makes possible an improvement of the efficiency.

In order to direct both component beams with the same polarization onto the laser medium, as a rule, an optical element, which rotates the polarization direction is provided because a polarizing beam splitter imparts orthogonal polarization to both component beams.

According to another feature of the invention, a dichroic in-coupling mirror is provided at an angle in the resonator for one component beam. This arrangement is especially advantageous when an intracavity doubling of frequency or another frequency shift with nonlinear optical elements is provided and the mirror, which is arranged at an angle, simultaneously couples the frequency-shifted light out of the laser resonator.

The use of a mirror arranged at an angle and being provided with a hole in the area of the laser beam advantageously does not affect the laser beam.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
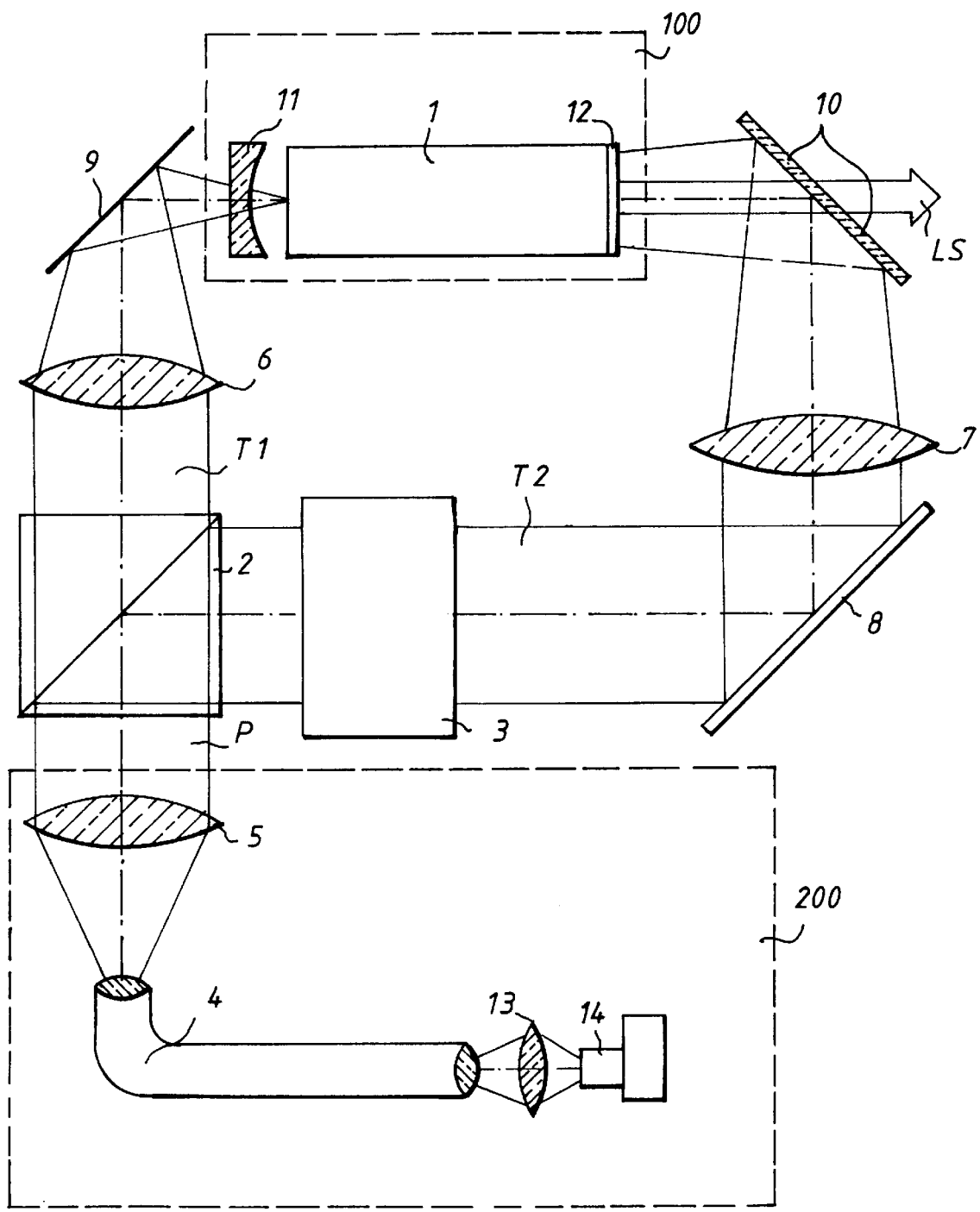
FIG. 1 shows a solid-state laser pumped at both ends and having a pump light source with a laser diode array and having fiber coupling, polarization splitting according to the invention and a polarization rotation element in one component beam.

The arrangement shown in FIG. 1 includes a laser resonator 100 and a pump light source 200 in a known configuration in addition to the parts provided by the invention.

The laser resonator 100 comprises a laser medium 1, namely, a solid body which is preferably a crystal of Nd:YVO$_4$, Nd:YLF, Nd:LSB or Nd:YAP. These crystals are convenient to pump with the light from the GaAlAs laser diodes and emit in the near infrared which is useful for light conductor communications technology, et cetera or result in visible light with frequency doubling. The crystals listed above all have a preferred direction of polarization for the absorption of pump light as well as for the emission of laser light. The crystals are therefore suitable especially for the generation of polarized laser light. On the other hand, they have a good efficiency only when pumping short laser crystals with suitable polarized light.

One end of the laser medium 1 directly supports the out-coupling mirror 12 in the form of thin layers. The second resonator mirror 11 is concave and is here used as a separate part. Both mirrors (11, 12) are dichroic and are transmittant for the pump light and are coated as is the free end of the laser medium 1. The laser resonator 100 can therefore be optically pumped at both ends.

The pump light source 200 likewise corresponds to known embodiments having a laser diode array 14, focussing lens 13, light conductor 4 and condenser lens 5. The laser diode array 14 can also be assembled from several commercially available laser diode array chips in order to obtain powers in the order of magnitude of $10^1$ W. The focussing lens 13 can then be a lens array.

Light-conducting fibers can be used as the light conductor 4 and light-conducting fiber bundles can be used especially for higher energies. The collimator lens 5 can also be replaced by an arrangement for adapting the pump light beam cross section to the downstream optic.

In a manner known per se, the emission wavelength of the laser diode array 14 is adapted to the pump characteristic of the laser medium 1 by adapting the assembly of the laser diodes as well as the adjustment and stabilization of current and temperature.

The only disadvantage of such a pump light source 200 for use with polarization-sensitive medium 1 is that the polarization of the pump light (insofar as the polarization is present for the laser diode array 14) is cancelled by the light conductor 4 and the pump light beam P, which has been made available, is essentially unpolarized.

With the arrangement of the invention, it is achieved that this unpolarized pump light beam P is essentially supplied to the laser medium 1 completely linearly polarized, that is, without loss of one of two orthogonal linearly polarized components. Of course, it is also possible and, depending upon the circumstances purposeful, that the component beams (T1, T2) are partially polarized, that is, that they are pronouncedly elliptical.

A polarization beam splitter 2 is mounted at the output of the pump light source 200 for this purpose. The beam splitter generates two mutually perpendicular linearly polarized component beams T1 and T2. The first component beam T1 is focussed conventionally through the resonator mirror 11 into an end of the laser medium 1 via a focussing lens 6 and a deflecting mirror 9. The second component beam T2 is supplied to an optical element 3 ($\lambda/2$-plate), which rotates the polarization direction, and is there rotated by 90° into the polarization direction of the first component beam T1. A deflecting mirror 8 and a focussing lens 7 follow. A mirror 10 finally deflects the second pump light beam T2 onto the second end of the laser medium 1. The mirror 10 is dichroic so that the laser beam LS can pass therethrough unhindered.

Figure 2:
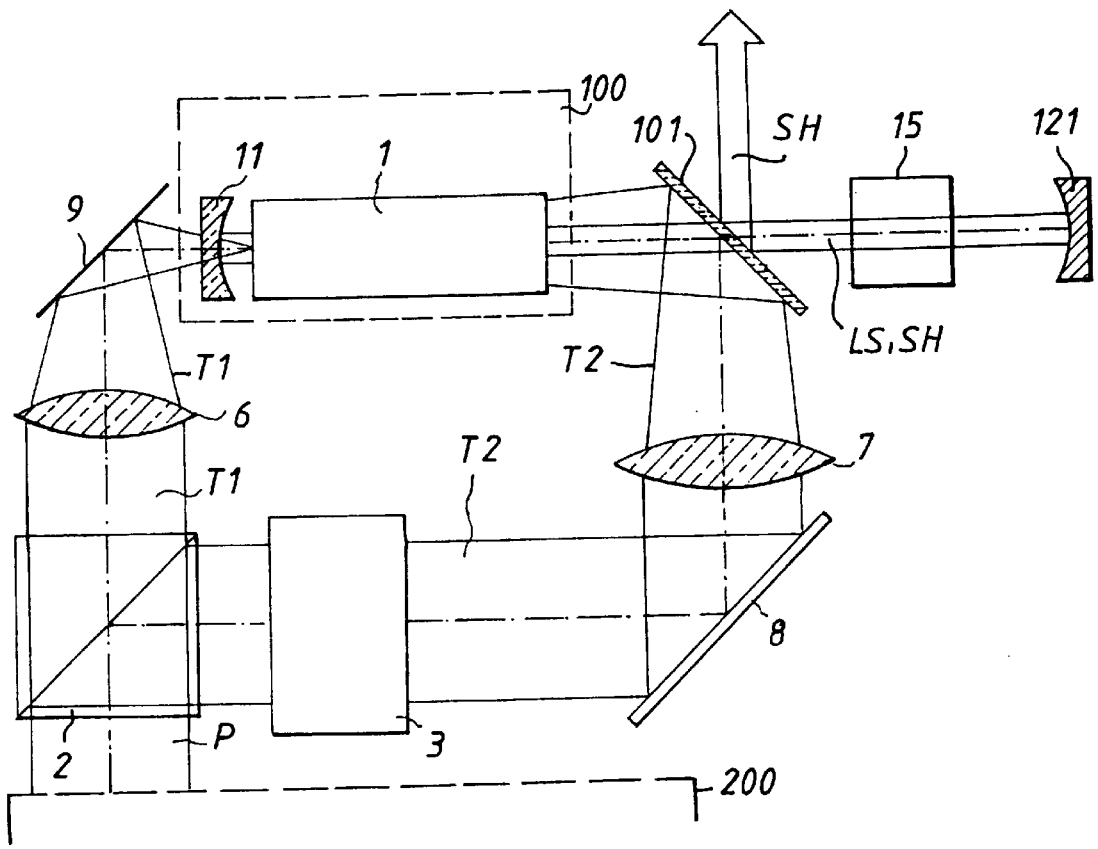
FIG. 2 shows a further embodiment including a laser having an SHG crystal and a mirror disposed at an angle in the resonator which couples in pump light on one end and couples out the light doubled in frequency at the other end.

An alternative to the above is shown in FIG. 2 where the second component beam T2 is coupled in by a dichroic mirror 101. The mirror 101 is transparent for the laser light LS. In the embodiment, the mirror 101 is mounted within the laser resonator which here also includes a frequency doubler crystal 15 and a separate second resonator mirror 121.

The rearward side of the mirror 101 is likewise coated so as to be dichroic in such a manner that the laser light LS is likewise allowed to pass through and the frequency-doubled light SH is coupled out of the laser resonator.

Of course, the dichroic in-coupling mirror can also be provided without this additional use.

Figure 3:
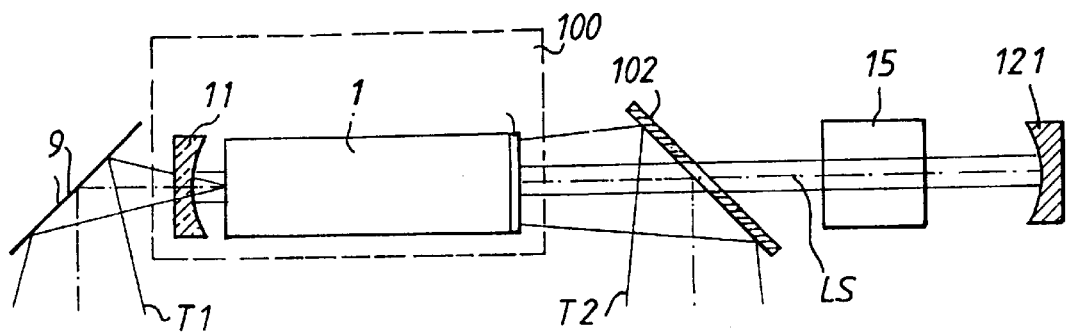
FIG. 3 is a detail of FIG. 2 with an apertured in-coupling mirror.

FIG. 3 shows that the mirror 102 can also have an aperture in the center so that the laser beam LS can pass unrestricted therethrough. FIG. 3 is otherwise a detail of FIG. 2 having the same parts. The loss component from the pump light beam caused by this aperture in mirror 102 is slight when the diameter of the laser beam LS and therefore the aperture is not too great. However, and as required, the loss of pump light can be further reduced in that an axicon is utilized to form an annular pump light beam.

Figure 4:
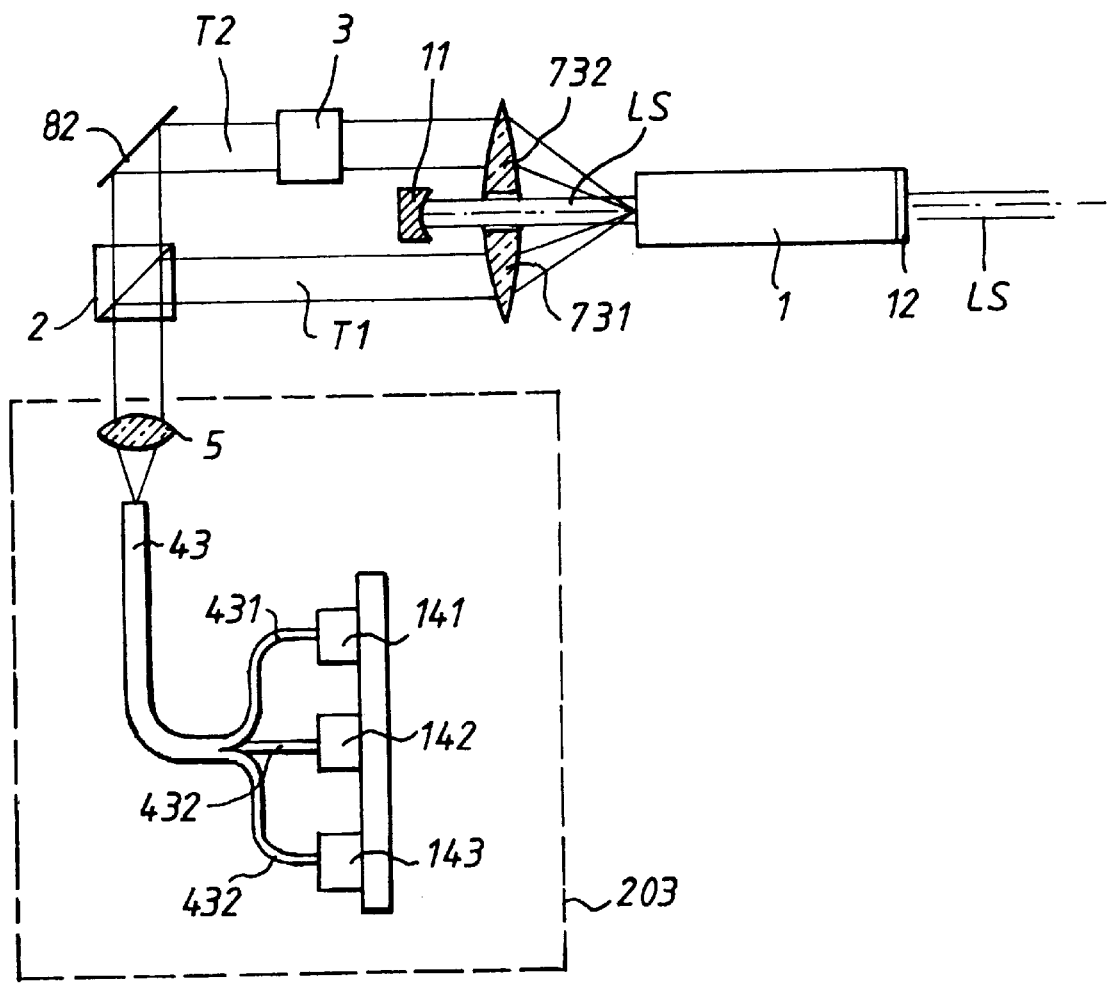
FIG. 4 shows an embodiment with pumping at one end.

A variation with pumping at one end of the laser medium 1 is shown in FIG. 4.

The pump light from the pump light source 203 reaches the polarization beam splitter 2. The pump light source 203 is described in greater detail below. The first component beam T1 is guided directly to a lens 731 and the second component beam T2 is guided via a deflecting mirror 82 and the element 3 to lens 732. The element 3 rotates the polarization. The lenses 731 and 732 are like segments of a normal converging lens. The central region of the converging lens remains clear for the laser beam LS between the resonator mirror 11 and the laser medium 1. The laser medium 1 supports the out-coupling mirror 12 on the opposite side thereof. Parts having the same numbers correspond in their configuration to the parts described with respect to FIGS. 1 and 2.

The two component beams T1 and T2 are directed at an angle from the side by the lenses 731 and 732 onto the end of the laser medium 1 and are focussed in the end region. The end is coated for the laser light LS and the pump light (T1, T2). It is possible to permit the component beams (T1, T2) to impinge upon the end next to the laser beam LS which goes back and forth in the laser resonator. Then, separate regions of the end of the laser medium 1 can be coated for the two wavelengths.

The lenses (731, 732) can also be joined to a convex drilled lens if that is advantageous with respect to manufacture.

Such a pump arrangement can also be additionally mounted at the second end of the laser medium 1 in order to increase the power of the laser. One advantage is that the region of the laser beam LS is not touched by the pump arrangement.

The pump light source 203 is shown here in a variation which has several chips (141, 142, 143) with laser diodes or laser diode arrays whereby their power can be scaled. The chips (141, 142, 143) are coupled directly (butt coupling) to the ends of the branches (431, 432, 433) of the light conductor fiber bundle 43.

Of course, the pump light sources (200, 203) or others are to be coupled to the remainder of the arrangement according to the invention of FIGS. 1 to 4 as required.

The examples are for polarization-sensitive solid bodies as the laser medium. The invention is however also suitable for other lasers having other optically pumped laser media.

It is understood that the foregoing description is that of the preferred embodiments of the invention and that various changes and modifications may be made thereto without departing from the spirit and scope of the invention as defined in the appended claims.

What is claimed is:

1. An optically pumped laser comprising:
   a laser resonator having a laser medium defining an optical axis;
   a pump light source for supplying a pump light beam;
   a polarization beam splitter for splitting said pump light beam into a first component beam and a second component beam;
   a first set of optics for conducting said first component beam to said laser medium;
   a second set of optics for conducting said second component beam to said laser medium;
   said laser resonator defining a specific polarization direction for said pump light beam; and,
   said first set of optics being adapted to conduct said first component beam to said laser medium polarized with said specific polarization direction and said second set of optics being likewise adapted to conduct said second component beam to said laser medium also polarized with said specific polarization direction.

2. The optically pumped laser of claim 1, said laser medium having first and second end faces which are penetrated by a laser beam generated in response to said first and second component beams; and, said first set of optics being configured to conduct said first component beam to said first end face and said second set of optics being configured to conduct said second component beam to said second end face.

3. The optically pumped laser of claim 2, said first and second sets of optics being configured to conduct said first and second component beams, respectively, to said first and second end faces, respectively, along said optical axis.

4. The optically pumped laser of claim 1, said laser medium having an end face transverse to said optical axis and said end face being penetrated by a laser beam generated in response to said first and second component beams and transmitted along said optical axis; and, said first and second sets of optics both being configured to conduct said first and second component beams to said end face.

5. The optically pumped laser of claim 1, said laser medium having an end face transverse to said optical axis and said end face being penetrated by a laser beam generated in response to said first and second component beams and transmitted along said optical axis; and, said first and second sets of optics being configured to conduct said first and second component beams to said end face at an angle to said optical axis so that said component beams do not touch said optical axis.

6. The optically pumped laser of claim 1, said pump light source including a light conductor.

7. The optically pumped laser of claim 6, said light conductor being at least one light conducting fiber.

8. The optically pumped laser of claim 1, said pump light source including at least one laser diode.

9. The optically pumped laser of claim 1, said pump light source including at least one laser diode array.

10. The optically pumped laser of claim 1, said laser medium being a solid body.

11. An optically pumped laser comprising:
    a laser resonator having a laser medium defining an optical axis;
    a pump light source for supplying a pump light beam;
    a device for splitting said pump light beam into a first component beam and a second component beam;
    a first set of optics for conducting said first component beam to said laser medium;
    a second set of optics for conducting said second component beam to said laser medium;
    said laser medium being a solid body; and,
    said solid body being a crystal selected form the group consisting of Nd:YVO$_4$, Nd:YLF, Nd:LSB and Nd:YAP.

12. The optically pumped laser of claim 1, said first and second sets of optics defining first and second component beam paths; and, one of said sets of optics including an optical element rotating polarization direction and said optical element being arranged in the component beam path corresponding thereto.

13. The optically pumped laser of claim 1, said laser resonator including a dichroic mirror at an angle to said optical axis for deflecting said second component beam into said laser medium.

14. The optically pumped laser of claim 1, said laser resonator including a nonlinear optical element mounted therein for generating frequency shifted light from laser light generated in said laser medium.

15. The optically pumped laser of claim 14, said laser resonator including a dichroic mirror adapted to couple said frequency-shifted light out of said laser resonator.

16. The optically pumped laser of claim 1, said second set of optics including a mirror mounted at an angle to said optical axis for coupling said second component beam into said laser medium; and, said mirror having a hole formed therein for passing laser light generated in said laser medium therethrough.

17. The optically pumped laser of claim 13, said laser resonator including a nonlinear optical element mounted therein for generating frequency-shifted light from laser light generated in said laser medium; and, said dichroic mirror adapted to couple said frequency-shifted light out of said laser resonator.

* * * * *

UNITED STATES PATENT AND TRADEMARK OFFICE
CERTIFICATE OF CORRECTION

PATENT NO. : 6,137,820
DATED : October 24, 2000
INVENTOR(S) : Robert Maag, Heinz Abramowsky and Martin Wiechmann It is certified that error appears in the above-identified patent and that said Letters Patent is hereby corrected as shown below:

<u>Column 6,</u>
Line 21, delete "form" and substitute -- from -- therefor.

Signed and Sealed this

Sixteenth Day of October, 2001

*Attest:*

NICHOLAS P. GODICI
*Attesting Officer*    *Acting Director of the United States Patent and Trademark Office*